(12) United States Patent
Na

(10) Patent No.: US 9,849,877 B2
(45) Date of Patent: Dec. 26, 2017

(54) APPARATUS AND METHOD FOR CONTROLLING VEHICLE

(71) Applicant: MANDO CORPORATION, Pyeongtaek-si, Gyeonggi-do (KR)

(72) Inventor: Hyuck Min Na, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/002,290

(22) Filed: Jan. 20, 2016

(65) Prior Publication Data

US 2016/0214619 A1 Jul. 28, 2016

(30) Foreign Application Priority Data

Jan. 22, 2015 (KR) .................. 10-2015-0010578

(51) Int. Cl.
| | |
|---|---|
| *B60W 10/20* | (2006.01) |
| *G07C 5/08* | (2006.01) |
| *G08B 21/06* | (2006.01) |
| *B60W 30/12* | (2006.01) |
| *B60W 50/14* | (2012.01) |
| *B60K 28/06* | (2006.01) |
| *B60W 10/184* | (2012.01) |
| *B60W 40/08* | (2012.01) |

(52) U.S. Cl.
CPC ............ *B60W 30/12* (2013.01); *B60K 28/06* (2013.01); *B60K 28/066* (2013.01); *B60W 10/184* (2013.01); *B60W 10/20* (2013.01); *B60W 50/14* (2013.01); *B60W 2040/0827* (2013.01); *B60W 2420/42* (2013.01); *B60W 2520/125* (2013.01); *B60W 2540/18* (2013.01); *B60W 2540/26* (2013.01)

(58) Field of Classification Search
CPC ...... B60W 10/20; B60W 40/08; B60W 10/18; B60K 28/06; B60K 31/0008; G08B 21/06; G08G 1/166; B63H 20/12; B60T 7/22; G07C 5/08

See application file for complete search history.

(56) References Cited

U.S. PATENT DOCUMENTS 6,091,323 A * 7/2000 Kawai .................... B60Q 9/008
340/435
9,174,641 B2 * 11/2015 Fritz ..................... B60W 10/18
(Continued)

FOREIGN PATENT DOCUMENTS

KR 19990050660 A 7/1999

*Primary Examiner* — Yuri Kan
(74) *Attorney, Agent, or Firm* — Hauptman Ham, LLP

(57) ABSTRACT

An apparatus and method for controlling a vehicle are disclosed. A method for controlling a vehicle by monitoring a driver's state includes: a region setting step for establishing a first steering control region, a first steering warning region, a braking control region, and a first braking warning region of the vehicle; a driver state decision step for determining the driver state by monitoring a state of the driver; and a region resetting step for including, if the driver state is in an abnormal state in the driver state decision step, resetting a first steering control region of the vehicle, a first steering warning region, and a first braking warning region in the region setting region, and thus setting a second steering control region, a second steering warning region, and a second braking warning region.

9 Claims, 8 Drawing Sheets

(56) References Cited

U.S. PATENT DOCUMENTS

| | | | |
|---|---|---|---|
| 2003/0038715 A1* | 2/2003 | Engelman | B60Q 1/44 340/439 |
| 2004/0085197 A1* | 5/2004 | Watanabe | B60T 7/22 340/435 |
| 2004/0193374 A1* | 9/2004 | Hac | B60K 31/0008 701/301 |
| 2008/0119994 A1* | 5/2008 | Kameyama | B60W 40/08 701/48 |
| 2011/0218706 A1* | 9/2011 | Mori | B60W 10/06 701/36 |
| 2014/0114536 A1* | 4/2014 | Kobana | B60K 28/06 701/49 |
| 2014/0121927 A1* | 5/2014 | Hanita | B60T 7/14 701/70 |
| 2014/0277832 A1* | 9/2014 | Bando | G07C 5/08 701/1 |
| 2014/0329422 A1* | 11/2014 | Ito | B63H 20/12 440/1 |
| 2015/0066348 A1* | 3/2015 | Baba | G08G 1/166 701/301 |
| 2015/0294547 A1* | 10/2015 | Ito | G08B 21/06 340/576 |

* cited by examiner

APPARATUS AND METHOD FOR CONTROLLING VEHICLE

CROSS-REFERENCE TO RELATED APPLICATION

This application claims the benefit of Korean Patent Application No. 2015-0010578, filed on Jan. 22, 2015 in the Korean Intellectual Property Office, the disclosure of which is incorporated herein by reference.

BACKGROUND

1. Field

Embodiments of the present invention relate to an apparatus and method for controlling a vehicle, and more particularly to an apparatus and method for controlling a vehicle so as to control steering and braking of the vehicle by monitoring a state of a vehicle driver.

2. Description of the Related Art

Drive State Monitoring (DSM) is a device which captures images of a driver's face or the like using a camera embedded in a vehicle, and obtains information regarding the direction of the driver's face and the eye movement from the captured face image such that it can determine whether the driver feels sleepy or performs careless driving caused by mental or physical fatigue.

Lane Keeping Assist System (LKAS) is a device which captures a front-view image of the vehicle using a front camera embedded in the vehicle, and actively controls a steering device in a manner that the vehicle does not deviate from a current lane.

A conventional LKAS determines whether a vehicle deviates from a current lane or is scheduled to deviate from the current lane. If the vehicle has deviated from the current lane or is scheduled to deviate from the current lane, the conventional LKAS performs lane keeping control in a manner that the vehicle can maintain the current lane, or performs lane departure warning to inform the driver of a lane departure state or a lane departure expectation state.

However, assuming that the driver performs drowsy driving or careless driving caused by mental or physical fatigue, it is impossible to normalize vehicle driving at the proper time using the LKAS only, resulting in reduction of the driving safety.

CITED REFERENCE

Patent Document

Korean Patent Application Publication No. 1999-0050660

SUMMARY

Therefore, it is an aspect of the present invention to provide an apparatus and method for controlling a vehicle, which can control steering and braking of the vehicle when a driver is in an abnormal state according to the monitoring result of the driver state, and can perform steering warning and braking warning in early stages.

Additional aspects of the invention will be set forth in part in the description which follows and, in part, will be obvious from the description, or may be learned by practice of the invention.

In accordance with an aspect of the present invention, a method for controlling a vehicle by monitoring a driver's state includes: a region setting step for establishing a first steering control region, a first steering warning region, a braking control region, and a first braking warning region of the vehicle; a driver state decision step for determining the driver state by monitoring a state of the driver; and a region resetting step for including, if the driver state is in an abnormal state in the driver state decision step, resetting a first steering control region of the vehicle, a first steering warning region, and a first braking warning region in the region setting region, and thus setting a second steering control region, a second steering warning region, and a second braking warning region.

The second steering control region may be larger in size than the first steering control region, the second steering warning region may be larger in size than the first steering warning region, and the second braking warning region may be larger in size than the first braking warning region.

The method may further include: a steering control region entry decision step in which the vehicle enters the second steering control region established in the region resetting step; a steering control step in which, if the vehicle enters the second steering control region in the steering control region entry decision step, steering the vehicle; a steering warning region entry decision step in which the vehicle enters the second steering warning region established in the region resetting step; a steering warning step to warn the vehicle driver that the vehicle has entered the second steering warning region in the steering warning region entry decision step; a braking warning region entry decision step to determine whether the vehicle enters the second braking warning region established in the region resetting step; a braking warning step to warn the vehicle driver that the vehicle has entered the second braking warning region in the braking warning region entry decision step; a braking control region entry decision step to determine whether the vehicle enters the braking control region established in the region setting step; and a braking control step to perform braking of the vehicle when the vehicle has entered the braking control region in the braking control region entry decision step.

The first steering control region, the first steering warning region, the second steering warning control region, and the second steering warning region may be formed along a vehicle lane; the first steering control region may be larger in width than the first steering warning region; and the second steering control region may be larger in width than the second steering warning region.

The first steering control region, the first steering warning region, the second steering control region, and the second steering warning region may be formed along a lane; the second steering warning region may be larger in width than the first steering control region; and the first steering control region may be larger in width than the first steering warning region.

The braking control region, the first braking warning region, and the second braking warning region may be formed on the basis of a distance to a front vehicle; a distance of the first braking warning region is shorter than a distance to the second braking warning region; and a distance of the braking control region is shorter than a distance of the first braking warning region.

The first braking warning region may include a plurality of sections according to respective distances; and the second braking warning region may include a plurality of sections according to respective distances in response to the first braking warning region composed of the plurality of sections.

The first braking warning region may include a first warning region, a second warning region, and a third warning region. The second braking warning region may include a first early warning region and a second early warning region, wherein a warning start time of the first early warning region is earlier than that of the first warning region and a warning start time of the second early warning region is earlier than that of the second warning region.

The distance of the braking control region may be identical to the distance of the third warning region.

In accordance with another aspect of the present invention, an apparatus for controlling a vehicle by monitoring a driver's state includes: a sensor unit configured to detect at least two of a steering angle, a steering-angle speed, lateral acceleration, and vehicle speed; a front camera configured to capture a front-view image of the vehicle; a driver camera configured to capture an image of the driver; a driver state decision unit configured to determine a state of the driver according to the image captured by the driver camera; a controller configured to control steering and braking of the vehicle according to the determined result of the driver state decision unit; and a warning unit configured to warn the driver of a dangerous state according to a control signal of the controller, wherein a steering control region for determining steering control of the vehicle, a steering warning region for determining steering warning of the vehicle, a braking control region for determining braking control of the vehicle, and a braking warning region for determining braking warning of the vehicle are established in the controller, and the controller performs resetting of the steering control region, the steering warning region, and the braking warning region according to the determined result of the driver state decision unit.

If the driver is in an abnormal state according to the determined result of the driver state decision unit, the controller may perform resetting of respective regions in a manner that the steering control region, the steering warning region, and the braking warning region are extended in size.

The braking warning region may include a first warning region, a second warning region, and a third warning region according to a distance to a front vehicle. If the driver is in the abnormal state according to the determined result of the driver state decision unit, the controller may perform resetting in a manner that the first warning region and the second warning region are extended in size.

If at least two of the detected steering angle, the detected steering angle speed, the detected lateral acceleration, and the detected vehicle speed are higher than a predetermined threshold value, the driver state decision unit may determine that the driver is in the abnormal state.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
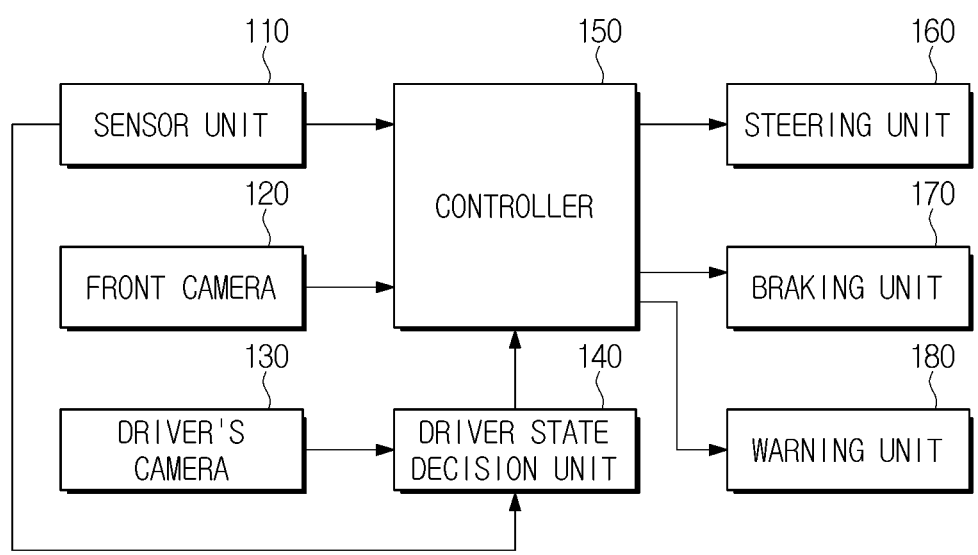
FIG. 1 is a block diagram illustrating a vehicle control apparatus according to an embodiment of the present invention.
Figure 2:
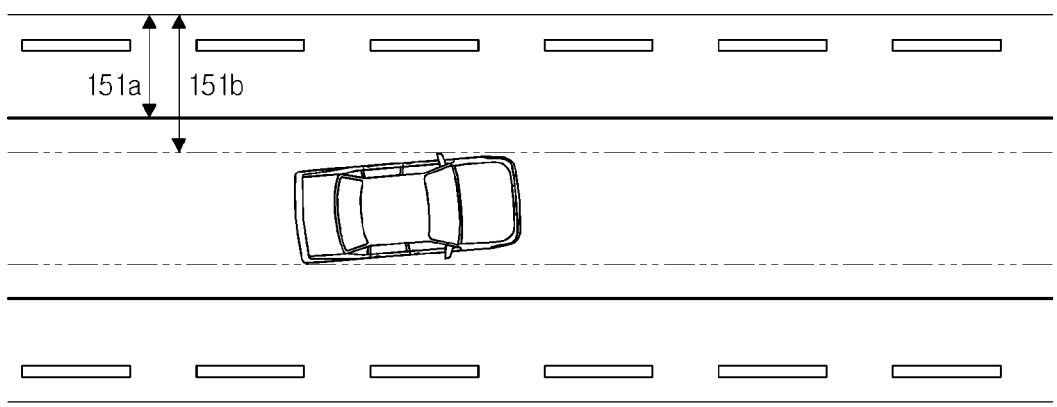
FIG. 2 illustrates a steering warning region of the vehicle control apparatus according to an embodiment of the present invention.
Figure 3:
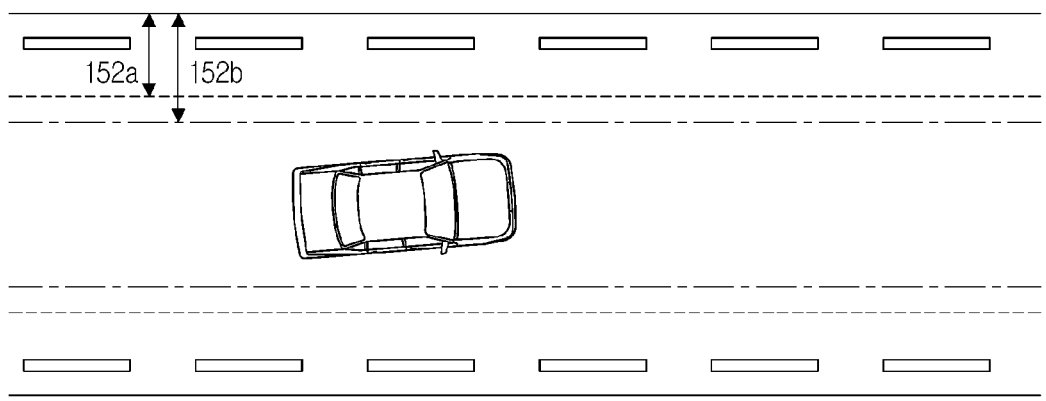
FIG. 3 illustrates a steering control region of the vehicle control apparatus according to an embodiment of the present invention.
Figure 4:
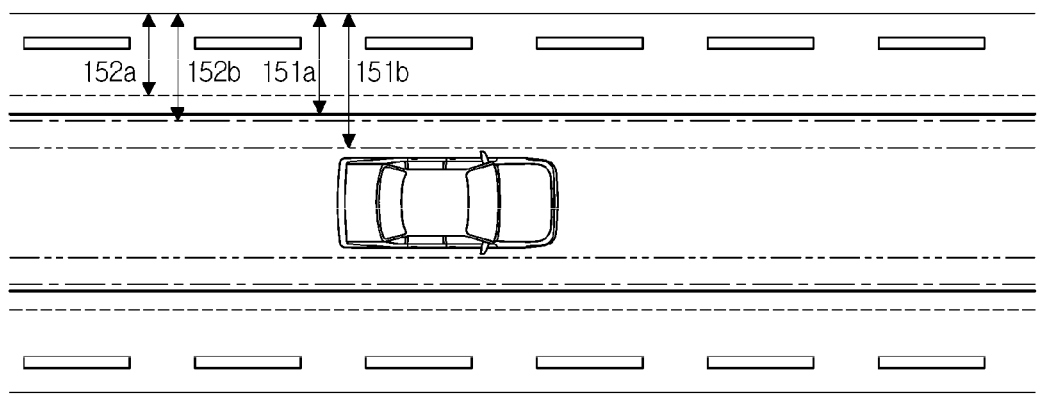
FIG. 4 illustrates the steering warning region and the steering control region of the vehicle control apparatus according to an embodiment of the present invention.
Figure 5:
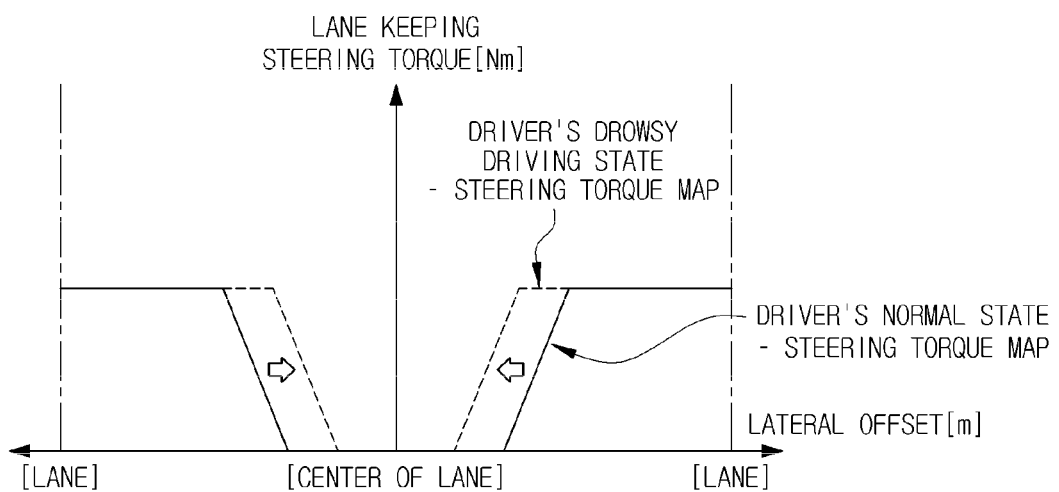
FIG. 5 illustrates the steering torque of the vehicle control apparatus according to an embodiment of the present invention.
Figure 6:
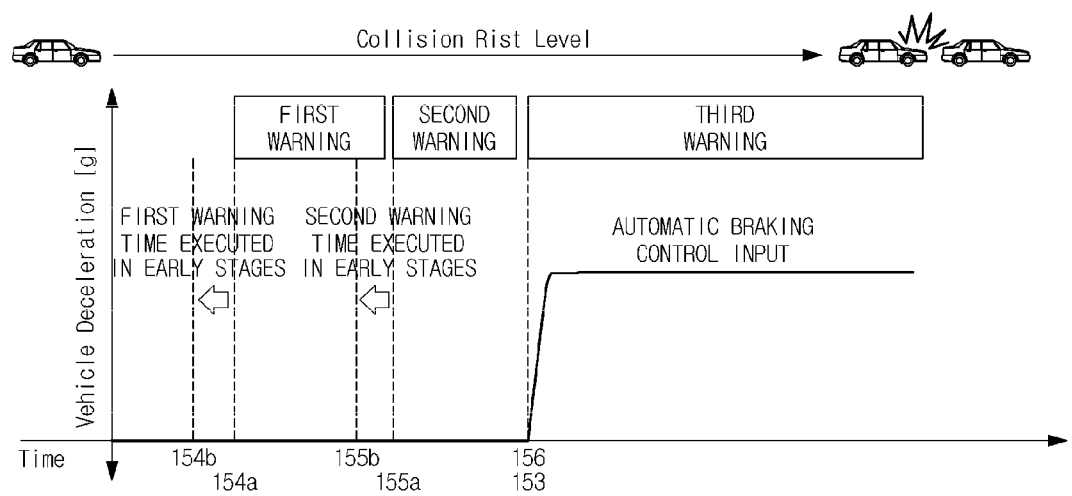
FIG. 6 illustrates the braking control region and the braking control region of the vehicle control apparatus according to an embodiment of the present invention.

Reference will now be made in detail to the embodiments of the present invention, examples of which are illustrated in the accompanying drawings, wherein like reference numerals refer to like elements throughout. In the following description of the present invention, a detailed description of known functions and configurations incorporated herein will be omitted when it may make the subject matter of the present invention rather unclear. In the drawings, elements unrelated to the embodiments of the present invention are omitted for clarity and the size of the components may be exaggerated for easy understanding.

Referring to FIGS. 1 to 6, the vehicle control apparatus to control a vehicle by monitoring a state of a driver who drives the vehicle may include a sensor unit 111, a front camera 120, a driver's camera 130, a driver state decision unit 140, a controller 150, a steering unit 160, a braking unit 170, and a warning unit 180.

The sensor unit 110 may detect the steering angle and a vehicle speed of the vehicle.

The sensor unit 110 may detect the steering angle and the vehicle speed of the vehicle.

The sensor unit 110 may include a vehicle speed sensor and a steering angle sensor.

The vehicle speed sensor may detect the vehicle speed. The vehicle sensor may be mounted to wheels of the vehicle so as to detect the vehicle speed on the basis of a wheel speed of the vehicle. The steering angle sensor may detect the steering angle of a steering wheel of the vehicle.

The front camera 120 may capture a front-view image of the vehicle.

The front camera 120 may include a Complementary Metal Oxide Semiconductor (CMOS) or Charge Coupled Device (CCD) image sensor so as to obtain digital image information or analog image information. The front camera 120 may convert the analog image information into digital image information using an analog-to-digital converter (ADC).

The driver's camera (hereinafter referred to as "driver camera") 130 may capture an image of the vehicle driver.

The driver camera 130 embedded in the vehicle may capture an image of the driver's face.

The driver camera 130 may include a Complementary Metal Oxide Semiconductor (CMOS) or Charge Coupled Device (CCD) image sensor so as to obtain digital image information or analog image information. The driver camera 130 may convert the analog image information into digital image information using the analog-to-digital converter (ADC).

The driver state decision unit 140 may determine the driver's state according to the image captured by the driver camera 130.

The driver state decision unit 140 may detect a current state of the vehicle driver so as to determine whether the driver is in a normal state or in an abnormal state.

The abnormal state of the driver may indicate a drowsy driving state or a state of averting the driver's eyes from the forward gazing.

The driver state decision unit 140 may determine the driver's state on the basis of the driver's face image captured by the driver camera 130.

For example, the driver state decision unit 140 may obtain the driver state information (e.g., the direction of the driver's face, the movement of the driver's eyes, etc.) from the captured driver's face image, and may determine the driver's drowsy or fatigue state on the basis of the obtained driver state information.

The driver state decision unit 140 may perform the algorithm to determine the forward gazing state of the driver. If the drowsy or fatigue state of the driver is decided, the driver state decision unit 140 may determine that the driver is in the abnormal state.

The driver state decision unit 140 may be incorporated with the controller 150 according to the design of the vehicle control apparatus according to the embodiment.

In addition, assuming that the change degree of the steering angle is higher than a predetermined threshold value on the basis of the steering angle obtained by the sensor unit 110, the driver state decision unit 140 may determine the drowsy driving state of the driver, such that it is determined that the driver is in the abnormal state.

The controller 150 may control the steering and braking operation of the vehicle according to the decision result of the driver state decision unit 140.

Referring to FIGS. 2 to 6, the steering control regions (151*a*, 151*b*), the steering warning regions (152*a*, 152*b*), the braking control region 153, and the braking warning regions (154*a*, 154*b*, 155*a*, 155*b*) may be established in the controller 150.

The controller 150 may re-establish the steering control regions (151*a*, 151*b*), the steering warning regions (152*a*, 152*b*), the braking control region 153, and the braking warning regions (154*a*, 154*b*, 155*a*, 155*b*) according to the decision result of the driver state decision unit 140.

If the driver is in the abnormal state according to the decision result of the driver state decision unit 140, the controller 150 may re-establish respective regions in such a manner that the steering control regions (151*a*, 151*b*), the steering warning regions (152*a*, 152*b*), and the braking warning regions (154*a*, 154*b*, 155*a*, 155*b*) can be extended in size.

The steering control regions (151*a*, 151*b*) may determine the steering control of the vehicle.

The steering control regions (151*a*, 151*b*) may include a first steering control region 151*a* and the second steering control region 151*b*.

The first steering control region 151*a* and the second steering control region 151*b* may be formed along the vehicle lanes.

The first steering control region 151*a* and the second steering control region 151*b* may be formed to have a predetermined width along the vehicle lanes. The second steering control region 151*b* may be larger in width than the first steering control region 151*a*.

The steering warning regions (152*a*, 152*b*) may determine the steering warning of the vehicle.

The steering warning regions (152*a*, 152*b*) may include the first steering warning region 152*a* and the second steering warning region 152*b*.

The first steering warning region 152*a* and the second steering warning region 152*b* may be arranged along the vehicle lanes.

The first steering warning region 152*a* and the second steering warning region 152*b* may be formed to have a predetermined width along the vehicle lanes. The second steering control region 152*b* may be larger in width than the first steering control region 152*a*.

In contrast, the first steering control region 151*a* may be larger in width than the first steering warning region 152*a*, and the second steering control region 151*b* may be larger in width than the second steering warning region 152*b*.

In addition, the second steering control region 151*b* may be larger in width than the second steering warning region 152*b*, the second steering control region 152*b* may be larger in width than the first steering warning region 151*a*, and the first steering control region 151*a* may be larger in width than the first steering warning region 152*a*.

The braking control region 153 may determine the braking control of the vehicle.

The braking control region 153 may be formed by a distance to the front vehicle.

The distance to the front vehicle may be calculated by calculation of the controller 150 on the basis of the image captured by the front camera 120.

The braking warning regions (154*a*, 154*b*, 155*a*, 155*b*) may determine the braking warning of the vehicle.

The braking warning regions (154*a*, 154*b*, 155*a*, 155*b*) may include the first braking warning regions (154*a*, 155*a*) and the second braking warning regions (154*b*, 155*b*).

The first braking warning regions (154*a*, 155*a*) and the second braking warning regions (154*b*, 155*b*) may be based on the distance to the front vehicle.

The distance between the first braking warning region (154*a* or 155*a*) and the front vehicle may be shorter than the other distance between the second braking warning region (154*b* or 155*b*) and the front vehicle.

The distance to the braking control region 153 may be shorter than the distance to the first braking warning region (154*a* or 155*a*).

The first braking warning region (154*a* or 155*a*) may include a plurality of sections according to respective distances. The second braking warning region (154*b* or 155*b*) may include a plurality of sections according to respective distances in such a manner that the second braking warning regions (154*b*, 155*b*) may correspond to the first braking warning regions (154*a*, 155*a*), respectively.

The first braking warning regions (154*a*, 155*a*) may include a first warning region 154*a* and a second warning region 155*a*. The second braking warning regions (154*b*, 155*b*) may include a first early warning region 154*b* and a second early warning region 155*b*. Here, the warning start time of the first early warning region 154*b* may be earlier than that of the first warning region 154*a*, and the warning start time of the second early warning region 155*b* may be earlier than that of the second warning region 155*a*.

The first braking warning regions (154*a*, 155*a*) and the second braking warning regions (154*b*, 155*b*) may include a third warning region 156.

The warning start time of the third warning region 156 may be earlier than those of the first warning region 154*a*, the second warning region 155*a*, the first early warning region 154*b*, and the second early warning region 155*b*.

The distance to the front vehicle in the third warning region 156 may be identical in length to the distance to the braking control region 153.

If the first braking warning regions (154*a*, 155*a*) and second braking warning regions (154*b*, 155*b*) include the third warning region 156, the controller 150 may re-establish the first warning region 154*b* and the second warning region 155a when the driver is in the abnormal state according to the decision result of the driver state decision unit 140, such that the first warning region 154b and the second warning region 155a can be extended when the driver is in the abnormal state.

If the first braking warning regions (154a, 155a) and the second braking warning regions (154b, 155b) include the third warning region 156, the controller 150 may respectively re-establish the first warning region 154b and the second warning region 155a to the first early warning region 154b and the second early warning region 155b, such that the distance between the front vehicle and the first warning region 154b and the distance between the second warning region 155a and the front vehicle can be extended when the driver is in the abnormal state.

The steering unit 160 may control vehicle steering in response to a control signal of the controller 150.

The steering unit 160 may perform steering of front wheels of the vehicle by adjusting the angle of front wheels of the vehicle.

The steering unit 160 may generate steering torque such that the vehicle can maintain the current lane in response to the steering torque control command received from the controller 150.

The steering unit 160 may adjust steering force of the vehicle, and may allow the vehicle not to deviate from the current lane.

The steering unit 160 may be an Electric Power Steering (EPS) unit.

The braking unit 170 may adjust braking force of the vehicle.

The braking unit 170 may adjust the braking force of the vehicle by adjusting hydraulic pressure applied to wheels of the vehicle.

The braking unit 170 may adjust the braking force of the vehicle by adjusting hydraulic pressure applied to at least one wheel of the vehicle.

The warning unit 180 may receive the warning control command from the controller 150 such that it informs the driver of a lane departure state or a lane departure expectation state.

The warning unit 180 may inform the driver of a vehicle collision expectation state according to the warning control command received from the controller 150.

The warning unit 180 may repeatedly inform the driver of the vehicle collision expectation state according to the distance to the front vehicle upon receiving the warning control command from the controller 150.

For example, the warning unit 180 may drive a buzzer to generate the warning or alarm sound, such that the warning unit 180 can warn the drive of the lane departure state or the collision expectation state.

The scope or spirit of the warning unit 180 is not limited only to specific embodiments, and may be implemented as various Human Machine Interface (HMI) devices configured to warn the driver of the lane departure state.

A method for controlling the vehicle according to an embodiment of the present invention will hereinafter be described with reference to FIGS. 7 and 8.

Figure 7:
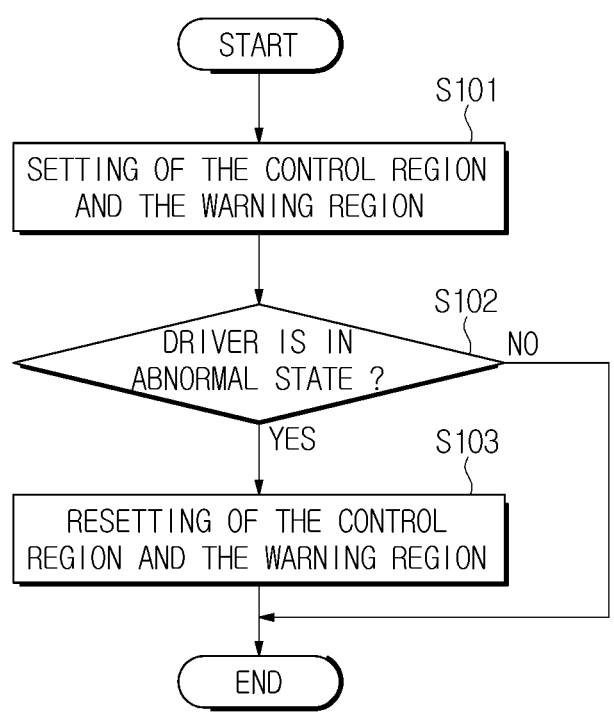
FIG. 7 is a flowchart illustrating a vehicle control method according to an embodiment of the present invention.
Figure 8:
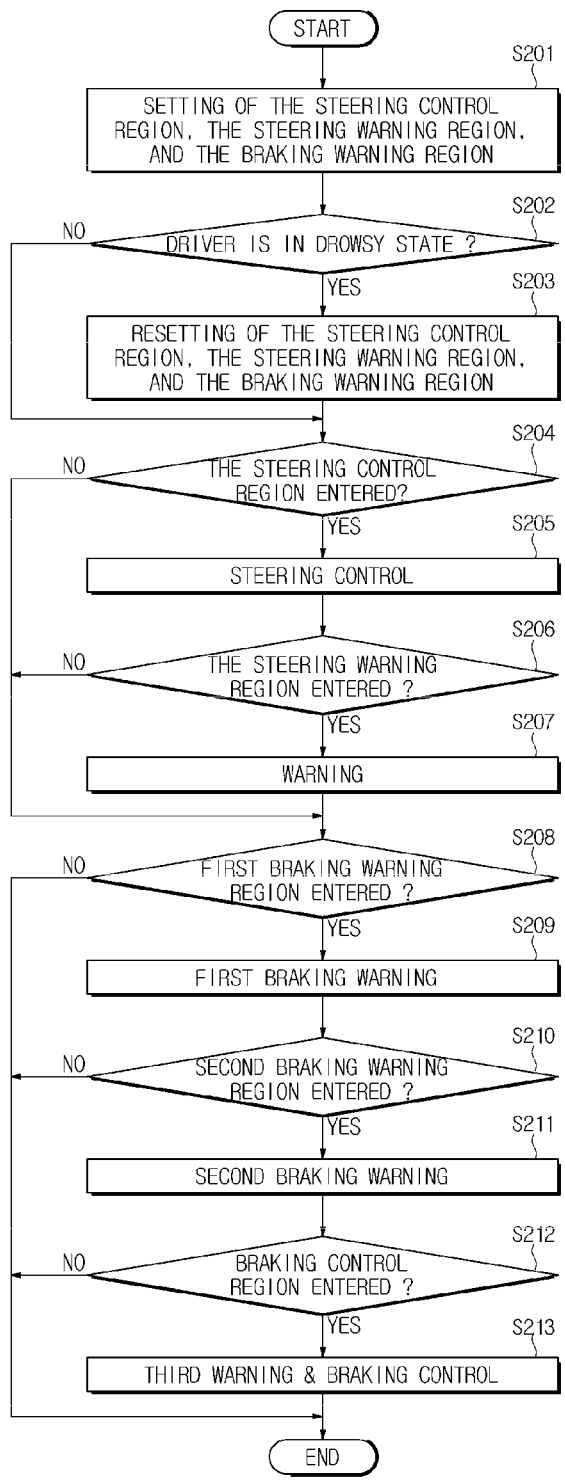
FIG. 8 is a flowchart illustrating a vehicle control method according to an embodiment of the present invention.

Referring to FIG. 7, the method for controlling the vehicle by monitoring the driver' state may include a region setting step S101, a driver state decision step S102, and a region resetting step S103.

The region setting step S101 may include a first steering control region 151a, the first steering warning region 152a, the braking control region 153, and the first braking warning regions (154a, 155a).

The driver state decision step S102 may monitor the driver's state so as to determine the resultant driver state.

If the driver is in the abnormal state in the driver state decision step S102, the region resetting step S103 may perform resetting of the first steering control region 151a, the first steering warning region 152a, and the first braking warning regions (154a, 155a) established in the region setting step S101, such that the second steering control region 151b, the second steering warning region 152b, and the second braking warning regions (154b, 155b) can be reset.

In addition, the vehicle control method for controlling the vehicle by monitoring the driver's state according to the embodiment may include a region setting step S201, a driver state decision step S202, a region resetting step S203, a steering control region entry decision step S204, a steering control step S205, a steering warning region entry decision step S206, a steering warning step S207, a first braking warning region entry decision step S208, a first braking warning step S209, a second braking warning region entry decision step S210, a second braking warning step S211, a braking control region entry decision step S212, and a braking control step S213.

The region setting step S201, the driver state decision step S202, and the region resetting step S203 are identical to the above region setting step S101, the above driver state decision step S102, and the above region resetting step S103, and as such a detailed description thereof will herein be omitted for convenience of description.

The steering control region entry decision step S204 may determine whether the vehicle enters the second steering control region 151b established in the region resetting step S203.

If the driver is in the normal state in the driver state decision step S102, the steering control region entry decision step S204 may determine whether the vehicle enters the first steering control region 151a established in the region setting step S201. The above-mentioned step of determining whether the vehicle enters the vehicle control region or the warning region established in the region setting step S201 when the driver is in the normal state may also be applied to the following steps to be described in a subsequent process without change.

The steering control step S205 may perform steering of the vehicle when the vehicle enters the second steering control region 151b in the steering control region entry decision step S204.

The steering warning region entry decision step S206 may determine whether the vehicle enters the second steering warning region 152b established in the region resetting step S203.

The steering warning step S207 may warn the driver that the vehicle has entered the second steering warning region 152b in the steering warning region entry decision step S206.

The first braking warning region entry decision step S208 may determine whether the vehicle enters the first early warning region 154b from among the second braking warning regions (154b, 155b) established in the region resetting step S203.

The first braking warning step S209 may warn the driver that the vehicle has entered the first early warning region 154b from among the second braking warning regions (154b, 155b) in the first braking warning region entry decision step S208.

The second braking warning region entry decision step S210 may determine whether the vehicle enters the second early warning region 155b from among the second braking warning regions (154b, 155b) established in the region resetting step S203.

The second braking warning step S211 may warn the driver that the vehicle has entered the second early warning region 155b from among the second braking warning regions (154b, 155b) in the second braking warning region entry decision step S210.

The braking control region entry decision step S212 may determine whether the vehicle enters the braking control region 153 established in the region setting step S201.

The braking control step S213 may perform braking of the vehicle when the vehicle has entered the braking control region 153 in the braking control region entry decision step S212.

The braking control step S213 may warn the driver that the vehicle enters the third warning region 156.

As is apparent from the above description, the apparatus and method for controlling the vehicle according to the embodiments can re-establish a steering control region according to a driver state, such that the vehicle driving can be quickly stabilized.

In addition, the apparatus and method for controlling the vehicle according to the embodiments can determine the driver state for re-establishing the steering warning region and the braking warning region according to the same reference, such that the steering warning and the braking warning can be simultaneously achieved according to the driver state.

In addition, since the steering control and the braking control are simultaneously performed, the embodiments can normalize the vehicle driving at the proper time even when the driver is in the abnormal state.

In addition, since the steering warning region and the braking warning region are re-established according to the driver state, the embodiments can quickly warn the driver of the abnormal driving state caused by drowsy driving or mental (or physical) fatigue.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for controlling a vehicle by monitoring a driver's state, the method comprising:
    setting a first steering control region, a first steering warning region, a braking control region, and a first braking warning region of the vehicle;
    determining the driver's state by monitoring a state of a driver; and
    if the determined driver's state is in an abnormal state, resetting the first steering control region, the first steering warning region, and the first braking warning region of the vehicle, to set a second steering control region, a second steering warning region, and a second braking warning region,
    wherein
        the braking control region, the first braking warning region, and the second braking warning region are formed on the basis of a distance to a front vehicle,
        a distance of the first braking warning region is shorter than a distance of the second braking warning region, and
        a distance of the braking control region is shorter than a distance of the first braking warning region, and
    wherein
        the first braking warning region includes a first plurality of sections according to respective distances, and
        the second braking warning region includes a second plurality of sections according to respective distances in response to the first braking warning region composed of the first plurality of sections.

2. The method according to claim 1, wherein
    the second steering control region is larger in size than the first steering control region,
    the second steering warning region is larger in size than the first steering warning region, and
    the second braking warning region is larger in size than the first braking warning region.

3. The method according to claim 1, further comprising:
    determining whether the vehicle enters the second steering control region;
    if the vehicle enters the second steering control region, steering the vehicle;
    determining whether the vehicle enters the second steering warning region;
    if the vehicle enters the second steering warning region, warning the driver that the vehicle has entered the second steering warning region;
    determining whether the vehicle enters the second braking warning region;
    if the vehicle enters the second braking warning region, warning the driver that the vehicle has entered the second braking warning region;
    determining whether the vehicle enters the braking control region; and
    if the vehicle enters the braking control region, performing braking of the vehicle.

4. The method according to claim 1, wherein
    the first steering control region, the first steering warning region, the second steering warning control region, and the second steering warning region are formed along a vehicle lane,
    the first steering control region is larger in width than the first steering warning region, and
    the second steering control region is larger in width than the second steering warning region.

5. The method according to claim 1, wherein
    the first steering control region, the first steering warning region, the second steering control region, and the second steering warning region are formed along a vehicle lane,
    the second steering warning region is larger in width than the first steering control region, and
    the first steering control region is larger in width than the first steering warning region.

6. A method for controlling a vehicle by monitoring a driver's state, the method comprising:
    setting a first steering control region, a first steering warning region, a braking control region, and a first braking warning region of the vehicle;
    determining the driver's state by monitoring a state of a driver; and
    if the determined driver's state is in an abnormal state, resetting the first steering control region, the first steering warning region, and the first braking warning region of the vehicle, to set a second steering control region, a second steering warning region, and a second braking warning region,
    wherein
        the braking control region, the first braking warning region, and the second braking warning region are formed on the basis of a distance to a front vehicle,
        a distance of the first braking warning region is shorter than a distance of the second braking warning region, and a distance of the braking control region is shorter than a distance of the first braking warning region, and wherein
the first braking warning region includes a first warning region, a second warning region, and a third warning region, and
the second braking warning region includes a first early warning region and a second early warning region, and wherein
a warning start time of the first early warning region is earlier than a warning start time of the first warning region and
a warning start time of the second early warning region is earlier than a warning start time of the second warning region.

7. The method according to claim 6, wherein the distance of the braking control region is identical to a distance of the third warning region.

8. An apparatus for controlling a vehicle by monitoring a driver's state, comprising:
a sensor unit configured to detect at least two of a steering angle, a steering-angle speed, lateral acceleration, and vehicle speed;
a front camera configured to capture a front-view image of the vehicle;
a driver camera configured to capture an image of a driver;
a driver state decision unit configured to determine, based on the image captured by the driver camera, whether the driver is in an abnormal state;
a controller configured to control steering and braking of the vehicle according to a determined result of the driver state decision unit; and
a warning unit configured to warn the driver of a dangerous state according to a control signal of the controller, wherein
a steering control region for determining steering control of the vehicle, a steering warning region for determining steering warning of the vehicle, a braking control region for determining braking control of the vehicle, and a braking warning region for determining braking warning of the vehicle are established in the controller, and
the controller performs resetting of the steering control region, the steering warning region, and the braking warning region according to the determined result of the driver state decision unit, wherein
the controller, if the driver is in an abnormal state according to the determined result of the driver state decision unit, performs resetting of respective regions in a manner that the steering control region, the steering warning region, and the braking warning region are extended in size, and wherein
the braking warning region includes a first warning region, a second warning region, and a third warning region according to a distance to a front vehicle; and
the controller, if the driver is in the abnormal state according to the determined result of the driver state decision unit, performs resetting in a manner that the first warning region and the second warning region are extended in size.

9. The apparatus according to claim 8, wherein the driver state decision unit, based on the detected at least two of the steering angle, the steering angle speed, the lateral acceleration, and the vehicle speed, further determines whether the driver is in the abnormal state.

* * * * *